United States Patent
Wall

(10) Patent No.: US 9,387,871 B2
(45) Date of Patent: Jul. 12, 2016

(54) STEERING HANDLE FOR A MOTOR VEHICLE AND MOTOR VEHICLE COMPRISING SUCH STEERING HANDLE

(71) Applicant: AUDI AG, Ingolstadt (DE)

(72) Inventor: Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/418,631

(22) PCT Filed: Jun. 13, 2013

(86) PCT No.: PCT/EP2013/001731
§ 371 (c)(1),
(2) Date: Jan. 30, 2015

(87) PCT Pub. No.: WO2014/023368
PCT Pub. Date: Feb. 13, 2014

(65) Prior Publication Data
US 2015/0203143 A1    Jul. 23, 2015

(30) Foreign Application Priority Data
Aug. 10, 2012 (DE) .......... 10 2012 015 909

(51) Int. Cl.
*G05G 1/10* (2006.01)
*B62D 1/04* (2006.01)

(52) U.S. Cl.
CPC .......... *B62D 1/046* (2013.01); *Y10T 74/20396* (2015.01)

(58) Field of Classification Search
CPC ............ B62D 1/046; B29L 2031/3047; G06F 3/0362; G06F 3/03549; Y10T 74/20834

USPC ....................... 345/167; 463/37, 38
See application file for complete search history.

(56) References Cited

U.S. PATENT DOCUMENTS 5,021,771 A * 6/1991 Lachman ............... B60K 35/00
                                                     273/148 B
6,226,570 B1    5/2001 Hahn
(Continued)

FOREIGN PATENT DOCUMENTS

CN    201749431    2/2001
CN    101815561    8/2010
(Continued)

OTHER PUBLICATIONS

English language translation of the International Preliminary Report on Patentability for PCT/EP2013/001731, mailed Feb. 19, 2015, 6 pages.
(Continued)

*Primary Examiner* — Adam D Rogers
(74) *Attorney, Agent, or Firm* — Staas & Halsey LLP

(57) ABSTRACT

A steering handle for a motor vehicle, when mounted on the motor vehicle, can bring about a directional change of the motor vehicle. The steering handle has at least one ball element which is held on a corresponding fastening element of the steering handle as an operating element which can be pivoted about at least one pivot axis relative to the fastening element. The ball element is accessible for a user who pivots the ball element from a respective front side of the steering handle and the ball element, which front side faces the user, the ball element also being accessible for the user from a respective rear side of the steering handle and the ball element, which rear side faces away from the user and the front side.

13 Claims, 3 Drawing Sheets

(56) References Cited

U.S. PATENT DOCUMENTS

| | | | | |
|---|---|---|---|---|
| 6,418,362 | B1* | 7/2002 | St. Pierre | B60K 37/06 280/778 |
| 7,026,561 | B2 | 4/2006 | Min | |
| 7,236,158 | B2* | 6/2007 | Iisaka | G06F 3/03549 345/164 |
| 9,013,408 | B2* | 4/2015 | Tsai | A63F 13/06 345/156 |
| 2001/0002646 | A1 | 6/2001 | Leng | |
| 2005/0156891 | A1* | 7/2005 | Heide | G06F 3/03549 345/167 |
| 2005/0219216 | A1 | 10/2005 | Yoshikawa | |
| 2005/0255918 | A1* | 11/2005 | Riggs | A47C 3/16 463/37 |
| 2010/0184514 | A1 | 7/2010 | Tsai | |
| 2010/0288072 | A1 | 11/2010 | Springer et al. | |
| 2014/0157936 | A1* | 6/2014 | Wittorf | B60R 16/005 74/484 R |

FOREIGN PATENT DOCUMENTS

| | | |
|---|---|---|
| CN | 201677914 | 12/2010 |
| CN | 102530049 | 7/2012 |
| DE | 4423744 | 4/1995 |
| DE | 19743023 | 12/1998 |
| DE | 19743024 | 4/1999 |
| DE | 10004965 | 8/2001 |
| DE | 10035045 | 2/2002 |
| DE | 10361716 | 5/2005 |
| DE | 102006053499 | 8/2008 |
| DE | 112007003571 | 5/2010 |
| DE | 102012015909.9 | 8/2012 |
| EP | 1232909 | 8/2002 |
| WO | PCT/EP2013/001731 | 6/2013 |

OTHER PUBLICATIONS

German Office Action for German Priority Patent Application No. 10 2012 015 909.9, issued Feb. 8, 2013, 5 pages.

English Language International Search Report for PCT/EP2013/001731, mailed Nov. 4, 2013, 3 pages.

Chinese Office Action dated Jan. 21, 2016 from Chinese Patent Application No. 201380042180.3, 6 pages.

* cited by examiner

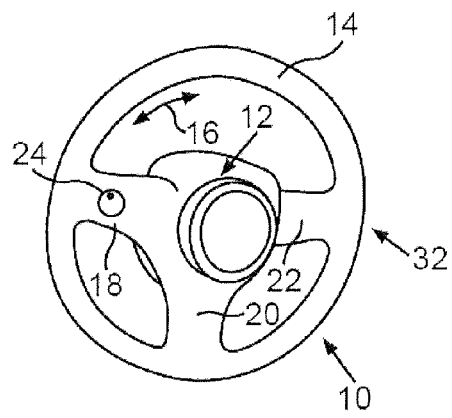
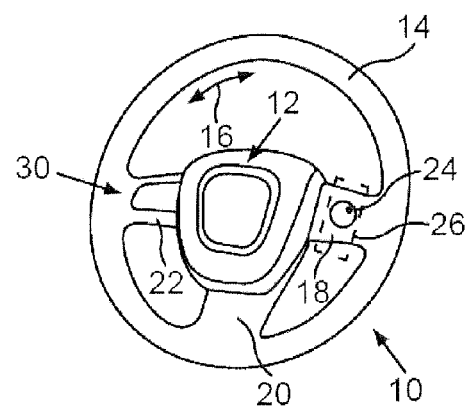
Fig.1a                    Fig.1b
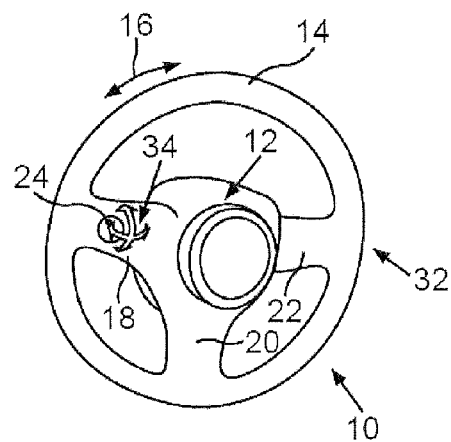
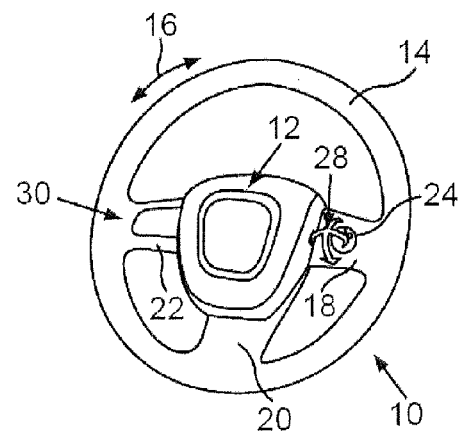
Fig.2a                    Fig.2b

STEERING HANDLE FOR A MOTOR VEHICLE AND MOTOR VEHICLE COMPRISING SUCH STEERING HANDLE

CROSS REFERENCE TO RELATED APPLICATIONS

This application is based on and hereby claims priority to International Application No. PCT/EP2013/001731 filed on Jun. 12, 2013 and German Application No. 10 2012 015 909.9 filed on Aug. 10, 2012, the contents of which are hereby incorporated by reference.

BACKGROUND

The invention relates to a steering handle for a motor vehicle.

A steering handle of this type for a motor vehicle can be gathered as known from DE 197 43 023 A1. The steering handle in said document is configured as a steering wheel and, in its state in which it is mounted on the motor vehicle, serves to bring about a directional change of the motor vehicle.

The steering handle has at least one ball element in the form of what is known as a trackball which is held on a corresponding fastening element of the steering handle. The trackball can be rotated about any desired rotational axes which are arranged in a common plane and serves, for example, to bring about a function of the motor vehicle. By the trackball, it is possible to represent the function of a computer mouse of a notebook or a PC (PC—personal computer) in a space-saving manner.

The trackball which can be pivoted about at least one pivot axis relative to the fastening element is accessible for a user who pivots the trackball from a respective front side of the steering handle and the trackball, which front side faces the user.

DE 197 43 024 A1 also discloses a steering handle for a motor vehicle in the form of a steering wheel, via which, in its state in which it is mounted on the motor vehicle, a directional change of the motor vehicle can be brought about, and which steering handle has at least one ball element which is held on a corresponding fastening element of the steering handle. The ball element is configured in the form of a trackball and can be pivoted about at least one pivot axis relative to the fastening element. Furthermore, the ball element is accessible for a user who pivots the ball element from a respective front side of the steering handle and the ball element, which front side faces the user.

US 2010/0288072 A1 has disclosed a steering wheel which comprises a free-standing rotary wheel which can be rotated about a rotational axis as operating element.

DE 103 61 716 A1 discloses a remote control button arrangement, installed into a vehicle steering wheel, with more than three front buttons which are arranged on a front face of a steering wheel, and with at least one side button which is provided in a lower section of a side face of a region of action, in which the front buttons are provided.

A steering wheel switch module for a motor vehicle for integration into a spoked steering wheel of the motor vehicle can be gathered as known from DE 10 2006 053 499 A1. The steering wheel switch module comprises at least two multiple button operating switch arrangements, the steering wheel switch module being configured in such a way that it can be installed and dismantled as an entire module in a prefabricated manner into and from the steering wheel. Finally, a steering wheel with operating buttons is apparent from US 2001/0002646 A1. The known steering handles have operability which could be improved.

SUMMARY

It is therefore one possible object to provide a steering handle for a motor vehicle, which steering handle has particularly satisfactory operability.

The inventor propose a steering handle which can bring about a directional change of the motor vehicle in its state in which it is mounted on the motor vehicle. The steering handle has at least one ball element which is held on a corresponding fastening element of the steering handle as an operating element. This means that at least one function of the motor vehicle can be brought about by the ball element by a user of the steering handle.

Here, the ball element can be pivoted about at least one pivot axis relative to the fastening element and is accessible for a user who pivots the ball element from a respective front side of the steering handle and the ball element, which front side faces the user. In other words, the user can touch the ball element from the respective front side and can pivot it about the pivot axis as a result, in order thus to bring about the function.

In order to realize particularly satisfactory and flexible, that is to say versatile, usability of the ball element, it is provided that the ball element is also accessible for the user from a respective rear side of the steering handle and the ball element, which rear side faces away from the user and the front side. In other words, the user can also touch the ball element from the rear side of the ball element and the steering handle and, as a result, can pivot the ball element relative to the fastening element.

In one particularly advantageous refinement, a first function of the motor vehicle can be brought about by way of an actuation of the ball element from the respective front side, whereas a second function of the motor vehicle which is different than the first function can be brought about by way of an actuation of the ball element from the respective rear side.

Functions which are different than one another can be brought about by way of this two-sided actuability of the ball element, with the result that a doubling of the number of functions which can be brought about by way of actuating or pivoting the ball element can be realized in a manner which is neutral in terms of installation space.

In order to detect the operation of the ball element from the front side or from the rear side, at least one corresponding detection element is provided, for example. As a consequence of this distinction of the operation of the ball element and the resulting capability to realize a particularly high number of functions which can be brought about or input options, additional switches can be avoided which are intensive in terms of cost, installation space and weight. As an alternative or in addition, it is provided, for example, that a first switch is closed by way of actuation of the ball element from the front side and a second switch is closed by way of actuation of the ball element from the rear side. A respective function of the motor vehicle is then brought about by way of the respective closing of the corresponding switch.

It has been shown to be particularly advantageous if the ball element can be pivoted about any desired pivot axes which are arranged in a common plane. The ball element therefore provides what is known as a trackball which, for example, can fulfill the function of a computer mouse in a space-saving way. By the trackball, it is possible, for example, to move an indicator element which is represented on a display screen of the motor vehicle, what is known as a cursor, on a user interface which is indicated by the display screen. As an alternative or in addition, it is possible to scroll through different menu items of a menu, what are known as register cards on the display screen, by way of pivoting of the trackball.

In order to realize a particularly high functional fulfillment scope of the ball element, it is provided in a further embodiment that the ball element can be pressed by the user perpendicularly with respect to the pivot axis or perpendicularly with respect to the plane and is accessible for the user who presses the ball element both from the respective front side and from the respective rear side.

In a further refinement, the steering handle is configured as a steering wheel with a steering wheel hub and a steering wheel rim, the steering wheel rim being connected to the steering wheel hub via at least one steering wheel spoke. Here, the ball element is held on the steering wheel spoke as the fastening element. This provides particularly ergonomic usability of the steering handle, with the result that the driver can operate the ball element in a simple way even while driving, without the actuation of the ball element distracting the driver from the traffic.

The inventor also proposes a motor vehicle, in particular a passenger motor vehicle, having the proposed steering handle. Advantageous refinements of the steering handle are to be considered to be advantageous refinements of the motor vehicle, and vice versa. The steering handle has particularly satisfactory, flexible and ergonomic actuability, with the result that an interface which is very satisfactory in ergonomic terms is provided between the user and the motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1a shows a diagrammatic perspective rear view of a steering handle in the form of a steering wheel for a passenger motor vehicle, having a ball element which is accessible for a user from a respective front side of the steering wheel and the ball element, which front side faces the user, and from a respective rear side of the steering wheel and the ball element, which rear side faces away from the user and the front side, FIG. 1b shows a diagrammatic perspective front view of the steering wheel, FIG. 2a shows a diagrammatic perspective rear view of the steering wheel, the pivoting of the ball element from the rear side being illustrated, FIG. 2b shows a diagrammatic perspective front view of the steering wheel, the pivoting of the ball element from the front side being illustrated.

DETAILED DESCRIPTION OF THE PREFERRED EMBODIMENT

Figure 3A:
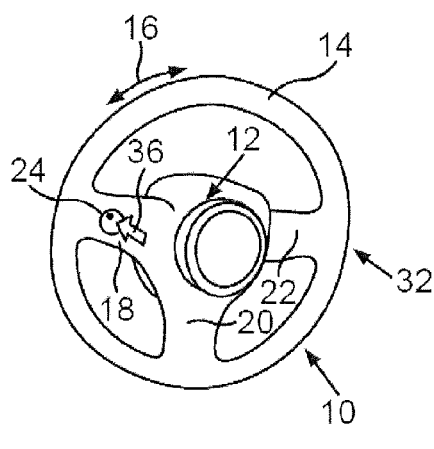
FIG. 3a shows a diagrammatic perspective rear view of the steering wheel, pressing of the ball element from the rear side being illustrated.

Reference will now be made in detail to the preferred embodiments of the present invention, examples of which are illustrated in the accompanying drawings, wherein like reference numerals refer to like elements throughout.

FIGS. 1a to 3b show a steering handle in the form of a steering wheel 10 for a passenger motor vehicle. The steering wheel 10 has a steering wheel hub 12 and a steering wheel rim 14 which surrounds the steering wheel hub 12 on the outer circumferential side in the circumferential direction of the steering wheel 10 which is illustrated by a directional arrow 16, and is connected to the steering wheel hub 12 via three steering wheel spokes 18, 20, 22 in the present case.

The steering wheel 10 can be connected to a steering linkage of the passenger motor vehicle via the steering wheel hub 12, with the result that a directional change of the passenger motor vehicle can be brought about by the steering wheel 10 in its state in which it is mounted on the passenger motor vehicle. To this end, the steering wheel 10 is rotated according to the directional arrow 16 about a rotational axis (not shown in FIGS. 1a to 3b). This rotation of the steering wheel 10 brings about a corresponding steering of steerable wheels of the passenger motor vehicle, which results in a directional change of the passenger motor vehicle.

An airbag which cannot be seen in FIGS. 1a to 3b is advantageously integrated into the steering wheel hub 12, which airbag can be moved out of a storage position into a restraining position if force is loaded as a result of an accident. To this end, for example, at least one absorbing element of the airbag is inflated by at least one gas generator with a gas, in particular air.

In the restraining position, the absorbing element assumes a restraining volume in the interior of the passenger motor vehicle, with the result that the driver of the passenger motor vehicle can be cushioned by the absorbing element in the case of being displaced as a result of an accident, can be restrained and can thus be protected against serious injury.

The steering wheel 10 also has an operating element in the form of a ball element 24. The ball element 24 is held on the steering wheel spoke 18. In other words, the steering wheel spoke 18 is a fastening element which corresponds with the ball element 24 and on which the ball element 24 is held such that it can be pivoted about at least one pivot axis relative to the fastening element (steering wheel spoke 18). In the present case, the ball element 24 can be pivoted about any desired pivot axes which are arranged in a common, imaginary plane 26. In this way, as is indicated by directional arrows 28 in FIG. 2b, the ball element 24 can be pivoted and/or rotated in any desired manner. What is known as a trackball is thus represented by the ball element 24.

Figure 4A:
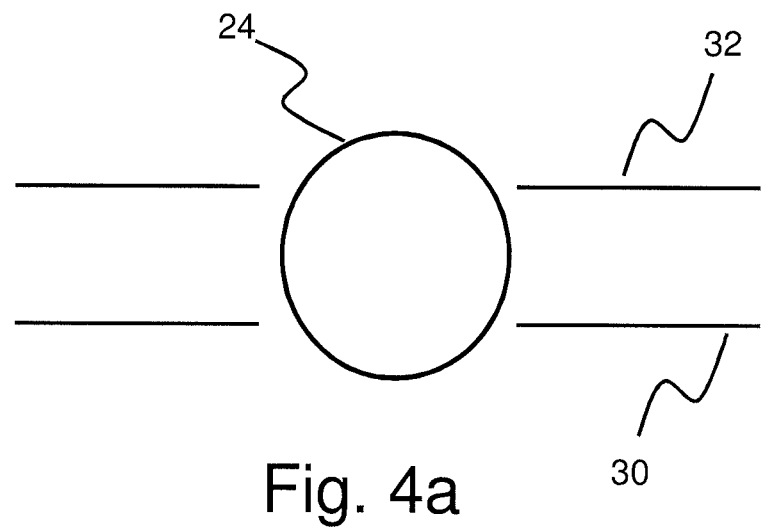
FIG. 4a shows a diagrammatic perspective side view of the steering wheel, in accordance with an example embodiment.
Figure 4B:
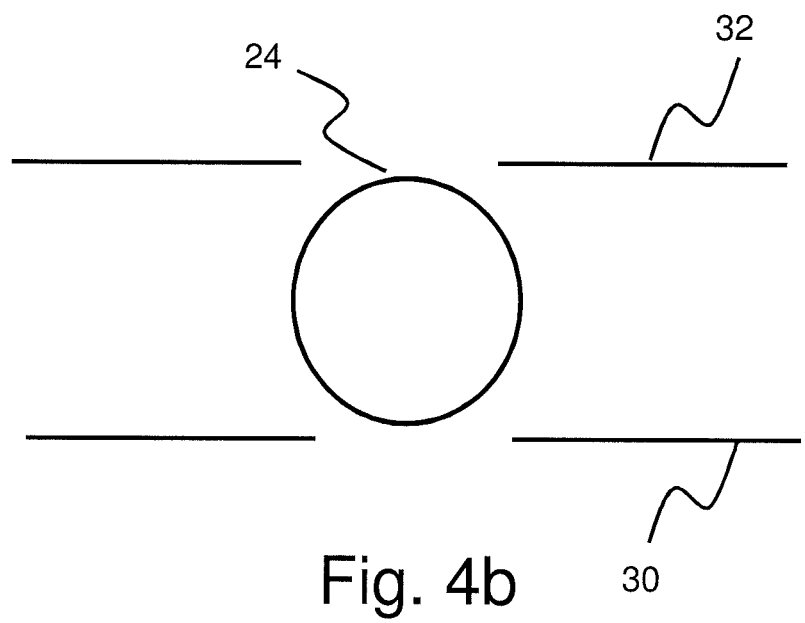
FIG. 4b shows a diagrammatic perspective side view of the steering wheel, in accordance with another example embodiment.

Here, the ball element 24 is accessible for the driver who pivots the ball element 24 from a respective front side 30 of the steering wheel 10 and the ball element 24, which front side 30 faces the driver. In other words, as user of the ball element 24, the driver can touch the ball element 24 from the front side 30 of the steering wheel 10 and the ball element 24 and can pivot or rotate it relative to the steering wheel spoke 18 as a consequence. To this end, as seen in FIG. 4a the ball element 24 protrudes at least partially beyond the steering wheel spoke 18 on the front side 30 in the direction of the driver. As an alternative to this, as seen in FIG. 4b, it is possible that the ball element 24 is recessed with respect to the steering wheel spoke 18 away from the driver and is accessible for the driver from the front side 30, for example, via a through opening of the steering wheel spoke 18.

In order to realize particularly satisfactory, flexible and ergonomic operability of the ball element 24, the ball element is also accessible for the driver from a respective rear side 32 of the steering wheel 10 and the ball element 24, which rear side 32 faces away from the driver and the front side 30, as can be seen, in particular, from FIGS. 1*a*, 2*a* and 3*a*.

As can be seen, in particular, using FIG. 2*a*, the driver can also touch the ball element 24 from the respective rear side 32 and can pivot it relative to the steering wheel spoke 18 as a consequence, as indicated by directional arrows 34 in FIG. 2*a*.

To this end, as seen in FIG. 4*a*, the ball element 24 protrudes at least partially beyond the steering wheel spoke 18 on the rear side 32 away from the driver. As an alternative to this, as seen in FIG. 4*b*, it can be provided that the ball element 24 is recessed on the rear side 32 with respect to the steering wheel spoke 18 toward the driver, and is accessible for the driver from the rear side 32 via a corresponding through opening.

By the ball element 24, it is possible, for example, to move an indicator element which is represented on a display screen of the passenger motor vehicle, what is known as a cursor, on a user interface which is indicated by the display screen. On account of the two-sided operability of the ball element 24, the indicator element can be moved on the user interface both by way of pivoting or rotating of the ball element 24 from the front side 30 and by way of pivoting or rotating of the ball element 24 from the rear side 32.

Figure 3B:
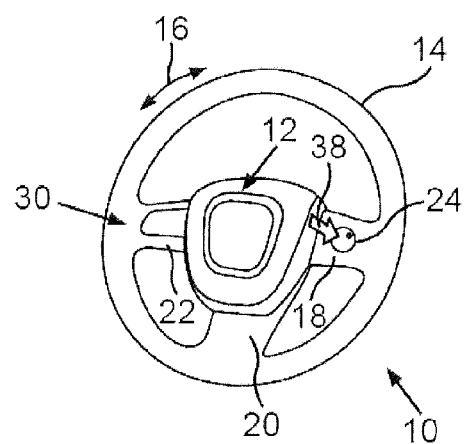
FIG. 3b shows a diagrammatic perspective front view of the steering wheel, pressing of the ball element from the front side being illustrated.

As can be seen from FIGS. 3*a* and 3*b*, the ball element 24 can also be pressed by the driver in an actuating direction which runs perpendicularly with respect to the imaginary plane 26. It can be seen using FIG. 3*a* that the driver can press the ball element 24 toward himself/herself along the actuating direction from the rear side 32. As a result, a first function of the passenger motor vehicle can be brought about, for example. This pressing toward the driver and the front side 30 is indicated in FIG. 3*a* by a directional arrow 36.

It can be seen using FIG. 3*b* that the ball element 24 can also be pressed away from the driver along the actuating direction. As a result, a second function of the passenger motor vehicle which is different than the first function can be brought about, for example. This pressing away from the driver and the front side 30 toward the rear side 32 is indicated in FIG. 3*b* by a directional arrow 38. As a result, a particularly high functional fulfillment scope of the ball element 24 is realized in a space-saving, weight-optimized and inexpensive way. A particularly high number of actuating options or input options can be realized in a manner which is neutral in terms of installation space by virtue of the fact that two different functions can be brought about by pressing of the ball element 24.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A steering handle, which when mounted to a motor vehicle and actuated by a user, causes a directional change of the motor vehicle, the steering handle comprising:
    a ball element supported by a fastening element of the steering handle, the ball element serving as an operating element which can be pivoted by the user about at least one pivot axis relative to the fastening element, wherein
    the steering handle and the ball element have opposing front and rear sides, the front side facing the user, the rear side facing away from the user and away from the front side,
    the ball element is accessible to the user from the front side of the steering handle and the front side of the ball element, and
    the ball element is also accessible to the user from the rear side of the steering handle and the rear side of the ball element,
    wherein
    the entire ball element is recessed below the front side of the steering handle and below the rear side of the steering handle such that the ball element is accessible through an opening in the front side of the steering handle and is accessible through another opening in the rear side of the steering handle.

2. The steering handle as claimed in claim 1, wherein
    a first function of the motor vehicle is brought about by actuating the ball element from the front side, and
    a second function of the motor vehicle, which is different from the first function of the motor vehicle, is brought about by actuating the ball element from the rear side.

3. The steering handle as claimed in claim 1, wherein the ball element can be pivoted about any desired pivot axes which are arranged in a common plane.

4. The steering handle as claimed in claim 1, wherein the ball element is rotatably held by the fastening element such that the ball element can rotate in any direction.

5. The steering handle as claimed in claim 1, wherein
    the steering handle extends in a plane that divides the front and rear sides of the steering handle,
    the fastening element holds the ball element such that the ball element is movable perpendicular to the plane of the steering handle, and
    the ball element is accessible through the opening for the user to press the ball element from the front side of the steering handle and is accessible through the another opening for the user to press the ball element from the rear side of the steering handle.

6. The steering handle as claimed in claim 5, wherein pressing the ball element from the front side of the steering handle produces a different function from pressing the ball element from the rear side of the steering handle.

7. The steering handle as claimed in claim 1, wherein
    the steering handle is a steering wheel with a steering wheel hub and a steering wheel rim,
    the steering wheel rim is connected to the steering wheel hub via a steering wheel spoke, and
    the steering wheel spoke corresponds to the fastening element and holds the ball element.

8. The steering handle as claimed in claim 7, wherein
    the steering wheel spoke has front and rear sides corresponding to the front and rear sides of the steering handle, and
    the entire ball element is recessed below the front side of the steering wheel spoke and below the rear side of the steering wheel spoke such that the ball element is accessible through the opening in the front side of the steering wheel spoke and is accessible through the another opening in the rear side of the steering wheel spoke.

9. The steering handle as claimed in claim 1, wherein the ball element is movable as a trackball to function as a computer mouse.

10. The steering handle as claimed in claim 1, wherein the ball element operates a user interface to move a cursor or scroll through a menu on a display screen.

11. The steering handle as claimed in claim 1, wherein a detection element detects pivoting of the ball element.

12. A motor vehicle, comprising:
a motor; and
a steering handle movably mounted in the motor vehicle to cause a directional change of the motor vehicle when actuated by a user, the steering handle comprising:
  a ball element supported by a fastening element of the steering handle, the ball element serving as an operating element which can be pivoted by the user about at least one pivot axis relative to the fastening element, wherein
  the steering handle and the ball element have opposing front and rear sides, the front side facing the user, the rear side facing away from the user and away from the front side,
  the ball element is accessible to the user from the front side of the steering handle and the front side of the ball element, and
  the ball element is also accessible to the user from the rear side of the steering handle and the rear side of the ball element,
wherein
the entire ball element is recessed below the front side of the steering handle and below the rear side of the steering handle such that the ball element is accessible through an opening in the front side of the steering handle and is accessible through another opening in the rear side of the steering handle.

13. The motor vehicle as claimed in claim 12, further comprising:
steerable wheels; and
a steering linkage,
wherein the steering handle is mounted to the steering linkage such that when the steering handle is rotated, the steering handle steers the steerable wheels.

* * * * *